UNITED STATES PATENT OFFICE.

LOUIS F. FRIDE, OF PHILADELPHIA, PENNSYLVANIA.

INSECTICIDE.

No. 890,636. Specification of Letters Patent. Patented June 16, 1908.

Application filed April 15, 1908. Serial No. 427,173.

*To all whom it may concern:*

Be it known that I, LOUIS F. FRIDE, a citizen of the United States, residing at 4908 Frankford avenue, in the city of Philadelphia, county of Philadelphia, and State of Pennsylvania, have invented a new and useful Insecticide to be Used for the Purpose of Removing San Jose Scale and Killing Insects Destructive to Trees and Vegetation, of which the following is a specification.

My insecticide consists of the following ingredients, combined in the proportions stated, viz: borax 44 per cent., powdered commercial lye 44 per cent., snuff tobacco 6 per cent., powdered alum 6 per cent.

One pound of the mixture of the above ingredients is to be mixed in fifty gallons of water, and this solution is to be sprayed upon the trees or vegetation which are either affected by the said scale or injurious insects, or it may be used for the purpose of protecting them from such scale or injurious insects. The water used in preparing the spray need not be heated. I am not aware that all the ingredients in my composition have been used together for this purpose.

I claim:

The herein described insecticide consisting of 44 per cent. borax, 44 per cent. of powdered commercial lye, 6 per cent. of snuff tobacco and 6 per cent. of powdered alum.

LOUIS F. FRIDE.

Witnesses:
J. WILLIS HOLTON,
G. LAWRENCE GAFF.